US008683540B2

(12) United States Patent
McCarthy et al.

(10) Patent No.: US 8,683,540 B2
(45) Date of Patent: Mar. 25, 2014

(54) SYSTEM AND METHOD TO RECORD ENCODED VIDEO DATA

(75) Inventors: Mary McCarthy, San Antonio, TX (US); Elizabeth Lopez, San Antonio, TX (US); Valerie H. Montalvo, San Antonio, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1176 days.

(21) Appl. No.: 12/253,346

(22) Filed: Oct. 17, 2008

(65) Prior Publication Data
US 2010/0098153 A1 Apr. 22, 2010

(51) Int. Cl.
*H04N 7/173* (2011.01)

(52) U.S. Cl.
USPC ............................. 725/116; 725/114; 725/115

(58) Field of Classification Search
None
See application file for complete search history.

(56) References Cited

U.S. PATENT DOCUMENTS

| | | | | |
|---|---|---|---|---|
| 5,892,535 | A * | 4/1999 | Allen et al. ...................... | 725/36 |
| 2002/0095689 | A1 * | 7/2002 | Novak ............................ | 725/151 |
| 2003/0189946 | A1 * | 10/2003 | Yajnik et al. ................... | 370/428 |
| 2004/0031058 | A1 | 2/2004 | Reisman | |
| 2004/0205816 | A1 * | 10/2004 | Barrett ............................ | 725/49 |
| 2005/0025320 | A1 | 2/2005 | Barry | |
| 2005/0028222 | A1 * | 2/2005 | Megeid .......................... | 725/135 |
| 2005/0163164 | A1 | 7/2005 | Cramer et al. | |
| 2005/0191031 | A1 | 9/2005 | Lee | |
| 2006/0037051 | A1 | 2/2006 | McDowell et al. | |
| 2006/0075442 | A1 * | 4/2006 | Meadow ......................... | 725/91 |
| 2006/0110065 | A1 * | 5/2006 | Huang et al. ................... | 382/275 |
| 2006/0126726 | A1 | 6/2006 | Lin et al. | |
| 2007/0014367 | A1 | 1/2007 | Zhou | |
| 2007/0044127 | A1 | 2/2007 | Vaysman et al. | |
| 2007/0136778 | A1 | 6/2007 | Birger et al. | |
| 2007/0157252 | A1 | 7/2007 | Perez | |
| 2007/0174876 | A1 | 7/2007 | Maggio et al. | |
| 2007/0277199 | A1 * | 11/2007 | Yoon et al. ...................... | 725/39 |
| 2008/0066139 | A1 | 3/2008 | Tsai | |
| 2008/0120682 | A1 | 5/2008 | Hardacker | |
| 2008/0134237 | A1 | 6/2008 | Tu et al. | |
| 2008/0263623 | A1 * | 10/2008 | Hildebrand et al. .......... | 725/152 |

OTHER PUBLICATIONS

"Belgacom TV Adds DVR Functionality," tvover.net <http://www.tvover.net/2007/02/15/Belgacom+TV+Adds+DVR+Functionality.aspx> Posted on Feb. 15, 2007, 1 page.
"Popular Video Audio Recording Software," Video Audio Stream Recording & Internet TV <http://www.netfor2.com/mainD.html> Retrieved on Jan. 16, 2012, 1 page.
"Relieving the OTT Burden—Improving Subscribers' Online Video Experience," CableNET, Petach Tikva, Israel, May 5, 2008, 2 pages.

* cited by examiner

*Primary Examiner* — Cai Chen
(74) *Attorney, Agent, or Firm* — Toler Law Group, PC

(57) ABSTRACT

A system includes a network interface to receive video packet data encoding video data from a remote server. The system includes a hardware decoder operable to decode a first type of encoded video data but not operable to decode a second type of encoded video data. The system also includes a software decoder to decode the second type of encoded video data. The system also includes a controller to determine whether the received video packet data includes the second type of encoded video data and to route the video packet data to the software decoder when the video packet data includes the second type of encoded video data.

21 Claims, 9 Drawing Sheets

SYSTEM AND METHOD TO RECORD ENCODED VIDEO DATA

FIELD OF THE DISCLOSURE

The present disclosure is generally related to recording encoded video data.

BACKGROUND

Multimedia service providers use networks to deliver multimedia content to subscribers. The majority of the multimedia content delivered via a particular network is sourced and encoded by the multimedia service provider. Content that is delivered via the network but not sourced or encoded by the multimedia service provider is referred to as Over-the-top (OTT) content because it is delivered on top of the service provider's network. OTT content includes community-based content and internet-based content. For example, community-based content may include Public, Education and Government (PEG) content, such as recorded city council meetings. Internet-based programming may include videos available at a popular video sharing website.

A set-top-box (STB) device supplied by the multimedia service provider to a subscriber may use a hardware decoder to decode encoded multimedia content. When the OTT content is encoded using a different type of encoding than the content provided by the multimedia service provider, the hardware decoder at the STB device may be unable to decode the OTT content. In addition, even when the STB device is able to decode the OTT content, the STB device is unable to record the OTT content because the OTT content does not include metadata used by the STB device to generate a title for the recorded content.

DETAILED DESCRIPTION

In a particular embodiment, a system includes a network interface to receive video packet data encoding video data received from a remote server. The system includes a hardware decoder that is operable to decode a first type of encoded video data but is not operable to decode a second type of encoded video data. The system includes a software decoder operable to decode the second type of encoded video data. The system includes a controller to determine whether the received video packet data includes the second type of encoded video data and to route the video packet data to the software decoder when the video packet data includes the second type of encoded video data.

In another embodiment, a method includes determining that community-based video content is not decodeable by a hardware decoder of a set top box device. The method includes identifying a software decoder to decode the community-based video content. The method also includes sending the software decoder over a broadband communication network to the set top box device.

In another embodiment, a computer-readable storage medium includes operational instructions, that when executed by a processor, cause the processor to receive video packet data encoding video data from a remote server. The computer-readable storage medium includes operational instructions, that when executed by the processor, cause the processor to determine whether the video packet data includes a type of encoded video data that is not decodable by a hardware decoder. The computer-readable storage medium includes operational instructions, that when executed by the processor, cause the processor to route the video packet data to a software decoder when the video packet data is not decodable by the hardware decoder. The computer-readable storage medium also includes operational instructions, that when executed by the processor, cause the processor to generate a title of the video data in response to a user selection to record the decoded video data. The title includes information retrieved from a channel map.

In another embodiment, a system includes a storage device to store a software decoder executable by a set top box device to decode encoded video data that is not decodable by a hardware decoder of the set top box device and to store a title generation module executable by the set top box device to record the decoded video data output of the software decoder. The system includes a network interface to communicate with the set top box device.

Figure 1:
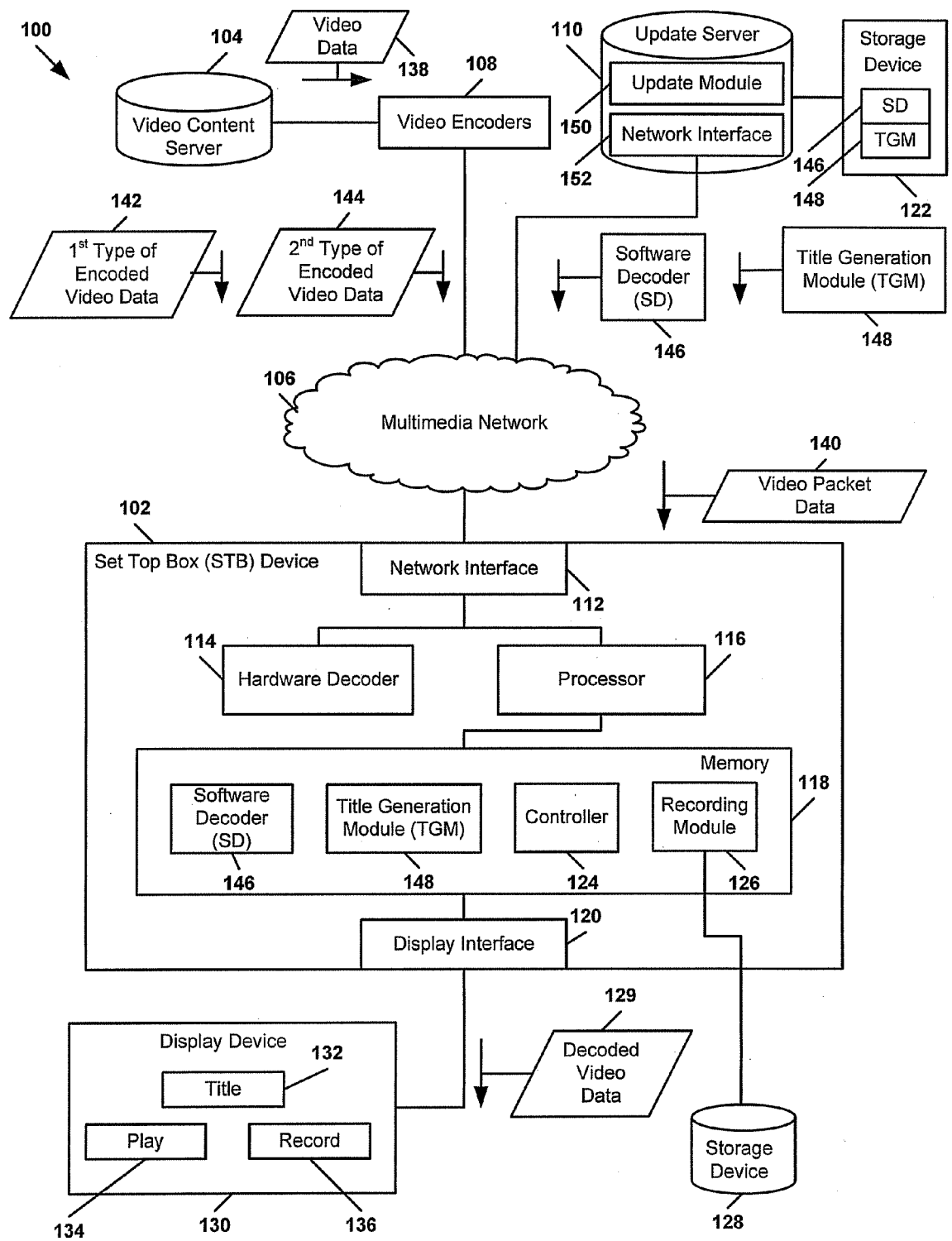
FIG. 1 is a block diagram of a first particular embodiment of a multimedia system to record encoded video data.

Referring to FIG. 1, a block diagram of a first particular embodiment of a multimedia system to record encoded video data is depicted and generally designated 100. The system 100 includes a set-top box device 102 in communication with a video content server 104 via a multimedia network 106. The video content server 104 is coupled to one or more video encoders 108. An update server 110 is coupled to the multimedia network 106. A storage device 128 is coupled to the update server 110. The set-top box device 102 includes a hardware decoder 114 and a software decoder 146. By including both the hardware decoder 114 and the software decoder 146, the set-top box device 102 is operable to receive and decode various types of encoded video data. For example, the set-top box device 102 may be configured to decode a first type of encoded video data 142, such as multimedia content provided by a multimedia service provider, at the hardware decoder 114, and to decode a second type of encoded video data 144, such as over-the-top (OTT) media content, at the software decoder 146.

In a particular embodiment, the set-top box device 102 includes a network interface 112, the hardware decoder 114, a processor 116, a display interface 120, and a memory 118. The set-top box device 102 is configured to receive encoded video data 142 and 144 via the multimedia network 106 at the network interface 112. The set-top box device 102 is further configured to decode the encoded video data 142 and 144 and to present the resulting decoded video data 129 at a display device 130 that is coupled to the set-top box device 102 via the display interface 120. The display device 130 is configured to display a title 132 of the decoded video data 129 and to provide user selectable controls, including a play control 134 and a record control 136. The set-top box device 102 is further configured to record the decoded video data 129 at the storage device 128 in response to the selection of the user selectable record control 136. In a particular embodiment, the decoded video data 129 is stored at the storage device 128 in a computer retrievable format.

In a particular embodiment, the hardware decoder 114 is operable to decode the first type of encoded video data 142 but is not operable to decode the second type of encoded video data 144. For example, the first type of encoded video data 142 may be provided by the video content server 104 via the video encoders 108. The first type of encoded video data 144 may include multimedia content, such as television content, video-on-demand content, or other multimedia content. The hardware decoder 114 may be configured to efficiently decode the first type of encoded video data at a rate to enable real-time display at the display device 130. In a particular embodiment, the hardware decoder 114 may be implemented as a system-on-a-chip (SOC).

In a particular embodiment, the first type of encoded video data 142 includes International Telecommunication Union (ITU) H.264 compliant encoded video and the second type of video data 144 includes Society of Motion Picture and Television Engineers (SMPTE) Windows Media Video (WMV) compliant encoded video. H.264 is a video compression standard that uses Motion Picture Experts Group type 4 (MPEG-4) encoding. H.264 compliant encoded video may be used with Internet Protocol television (IPTV). Windows Media Video (WMV) is a compressed video file format used by several proprietary video encoder-decoders. The WMV 9 codec was adopted as a standard by SMPTE and is known as SMPTE 421M. An H.264 decoder may be used to decode H.264 compliant encoded video but not WMV 9 compliant encoded video because H.264 compliant encoded video uses a different encoding standard than WMV 9 compliant encoded video.

In a particular embodiment, the memory 118 is accessible to the processor 116. The memory 118 includes a software decoder 146, a title generation module 148, a controller 124, and a recording module 126. The software decoder module 146 may be executable by the processor 116 to decode the second type of encoded video data 144 that is not decodeable at the hardware decoder 114. In a particular embodiment, the software decoder 146 and the title generation module 148 may be received from an update server 110 via the multimedia network 106.

In a particular embodiment, the title generation module 148 is executable by the processor 116 to generate metadata associated with the title of the second type of encoded video data 144 that is decoded at the software decoder 146. For example, the title generation module 148 may be configured to retrieve a channel identifier, a geographic region, a timestamp identifying when a recording of the decoded video data 129 was initiated, other data associated with encoded video data, or any combination thereof. The title generation module 148 generates a title using at least a portion of each of the retrieved channel identifier, geographic region, timestamp, other retrieved metadata, or any combination thereof. For example, the title generation module 148 may retrieve a channel identifier "KXYZ", a geographic location "Austin", and a timestamp "Jul. 16, 2008" and generate a title "Jul. 16, 2008—KXYZ—Austin".

The controller 124 is operable to receive the video packet data 140 from the network interface 112 and to identify the type of encoding used to encode the video data 138. After identifying the type of encoding, the controller 124 is operable to determine whether the hardware decoder 114 or the software decoder 146 is capable of decoding the video packet data 140. The controller 124 is operable to request the software decoder 146 to be downloaded from the update server 110. When the hardware decoder 114 is capable of decoding the video packet data 140, the controller 124 is operable to route the received video packet data 140 to the hardware decoder 114. When the software decoder 146 is capable of decoding the video packet data 140, the controller 124 is operable to route the received video packet data 140 to the software decoder 146.

In a particular embodiment, the controller 124 is executable by the processor 116 to determine whether the video packet data 140 received at the set-top box device 102 includes the second type of encoded video data 144 or the first type of encoded video data 142. The controller 124 is further executable by the processor 116 to route the video packet data 140 to the software decoder 146 when the video packet data includes the second type of encoded video data 144. The controller 124 is further executable by the processor 116 to execute the title generation module 148 in conjunction with decoding the second type of encoded video data 144 at the software decoder 146. The decoded video data 129 may be provided from the software decoder 146 to the recording module 126. In addition, the title generated at the title generation module 148 may be provided to the recording module 126. The recording module 126 may be configured to store the decoded video data 129 at the storage device 128. In particular, the recording module 126 may be executable by the processor 116 to direct the storage device 128 to receive and record the decoded video data 129 that is provided by the software decoder 146.

When recording the decoded video data 129 at the storage device 128, metadata used to generate a title is not available for the second type of encoded video data 144 because the OTT media content is not sourced by the multimedia service provider. Without the metadata, the storage device is unable to store a title associated with the recorded encoded video data 144. Therefore, metadata, such as the title generated at the title generation module 148, is stored at the storage device 128 and associated with the recorded first type of encoded video data 142.

In a particular embodiment, the video content server 104 and the video encoders 108 may be part of a multimedia data distribution system, such as an Internet Protocol Television System (IPTV) system. For example, the video content server 104 may receive video content via one or more video content sources (not shown) and may provide the video content as video data 138 to the video encoders 108. The video encoders 108 may be configured to encode the video data 138 using a first encoder (not shown) to create the first type of encoded video data 142 and to use a second encoder (not shown) to create the second type of encoded video data 144.

In a particular embodiment, the update server 110 includes an update module 150 and a network interface 152. The update module 150 may enable the update server 110 to interact with a storage device 122. The storage device 122 may store the software decoder 146 and the title generation module 148. In a particular embodiment, the update module 110 is responsive to a request received via the multimedia network 106 to authenticate the request. After authenticating the request, the update module 110 is operable to retrieve, and to provide the software decoder 146 and the title generation module 148 to the set-top box device 102. For example, a request to decode the second type of decoded video data 142 may be received via the network interface 152 of the update server 110. In response, the update server 110 may be configured to retrieve the software decoder 146 and the title generation module 148 from the storage device 122, and to send the retrieved content to the set-top box device 102.

During operation, a user of the set-top box device 102 may receive the first type of encoded video data 142 via the multimedia network 106. The set-top box device 102 may decode the first type of encoded video data 142 at the hardware decoder 114. The decoded video data 129 may be provided to the user at the display device 130, provided to the storage device 128 for storage, or any combination thereof.

A user of the set-top box device 102 may choose to receive the second type of encoded video data 144. For example, the second type of encoded video data 144 may include OTT video data, such as community-based programming video data. The second type of encoded video data 144 may be received at the set-top box device 102 and may not be decodeable at the hardware decoder 114. The set-top box device 102 may generate a request to the update server 110 to receive the software decoder 146 and the title generation module 148. In response, the update server 110 provides the software decoder 146 and the title generation module 148 to the set-top box device 102 via the multimedia network 106.

In response to receiving the software decoder 146 and the title generation module 148 at the set-top box device 102, the processor 116 installs the software decoder 146 and the title generation module 148 at the memory 118. When the user elects to receive the second type of encoded video data 144, the controller 124 may instruct the processor 116 to switch the decoding path of the received video data from the hardware decoder 114 to the software decoder 146. In addition, the controller 124 may instruct the title generation module 148 to generate metadata associated with the decoded video data 129. In addition, upon receipt of an instruction from a user to record the second type of encoded video data 144, the controller 124 may instruct the recording module 126 to record the output from the software decoder 146 and to store the metadata generated by the title generation module 148 at the storage device 128. For example, the title generation module 148 may generate a title that includes a channel identifier, a geographical location and a timestamp. The channel identifier and the geographical location may be retrieved from a channel map, as described in more detail in the descriptions of FIG. 2 and of FIG. 5 below. The timestamp may be retrieved from a system clock (not shown) of the set-top box device 102, as described in more detail in the description of FIG. 2.

After the decoded video data 129 has been stored at the storage device 128, a user of the set-top box device 102 may elect to view the stored video data. The user may instruct the set-top box device 102 to display a menu of recordings stored at the storage device 128 that are available for retrieval via a user interface of the display device 130. In response, the set-top box device 102 may display a title 132 of the available stored media of the second type of the encoded video data 142 at the display device 130 in addition to one or more selectable control elements. For example, the selectable control elements may include a play control 134 and a record control 136.

By enabling the second type of encoded video data 144 to be decoded at the software decoder 146 instead of at the hardware decoder 144, and by enabling metadata information, such as the title generated at the title generation module 148, the set-top box device 102 enables alternate encoding of video data to be decoded and stored at the storage device 128. In a particular embodiment, the storage device 128 is a digital video recorder (DVR) device. The metadata, such as the title 132, is generated and stored at the storage device 128, and the metadata enables a user to view a description of the stored video data at a menu for retrieval and for playback. By providing the software decoder 146 at the update server 110, rather than as a hardware addition to the set-top box device 102, a variety of multimedia encoding types are supported without updating the hardware decoder 114 to comply with video content encoded using new and emerging encoding technologies.

Figure 2:
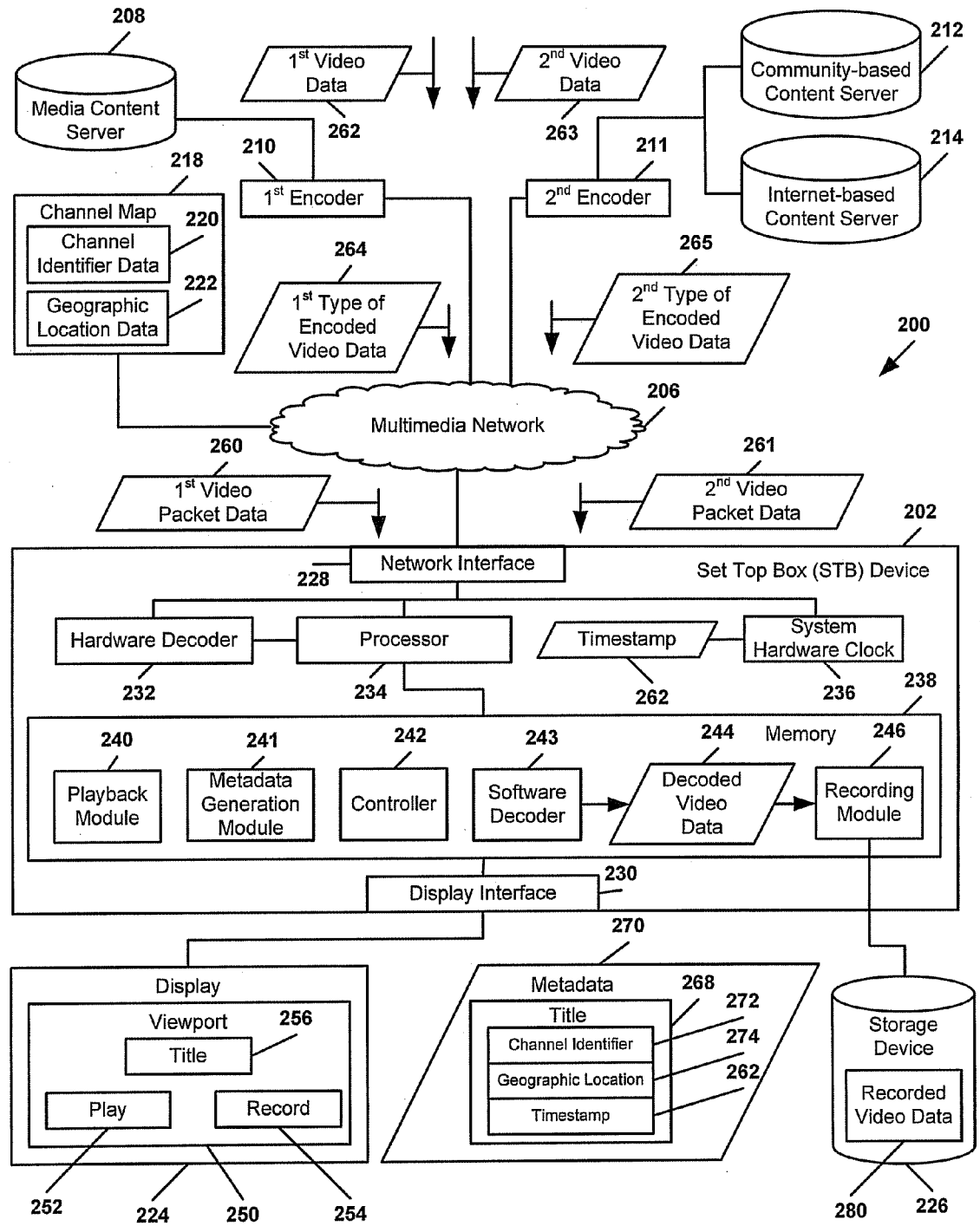
FIG. 2 is a block diagram of a second particular embodiment of a multimedia system to record encoded video data.

Referring to FIG. 2, a block diagram of a second particular embodiment of a multimedia system to record encoded video data is depicted and generally designated 200. The system 200 includes a set-top box (STB) device 202 coupled to a multimedia network 206. A media content server 208 is coupled to the multimedia network 206 via a first encoder 210. A community-based content server 212 and an Internet-based content server 214 are also coupled to the multimedia network 206 via a second encoder 211. A channel map 218, including a channel identifier 220 and a geographic location 222, is coupled to the multimedia network 206.

The channel map 218 associates a channel identifier to a channel number for a particular geographic service area that includes the STB device 202. The geographic location data 222 identifies the particular geographic service area. For example, the geographic service area may be the name of a city or region. The channel map 218 is stored at a server (not shown) of the multimedia network 206. The channel map 218 is described in more detail in the description of FIG. 5.

The central program guide data server 502 includes guide information associated with media content sourced by a service provider. The guide information includes information identifying video content to be transmitted at a particular channel at a particular time period. The first channel map 518 of the first channel map server 504 associates a channel identifier to a channel number at the first location 506.

The set-top box device 202 includes a network interface 228, a display interface 230, a hardware decoder 232, a processor 234, a system hardware clock 236, and a memory 238. The memory 238 includes a playback module 240, a metadata generation module 241, a controller 242, a software decoder 243, and a recording module 246. A display 250 is coupled to the set-top box device 202 via a display interface 230. A storage device 226 is coupled to the recording module 246 of the set-top box device 202.

The set-top box device 202 is configured to receive first video packet data 260 and second video packet data 261 encoding a portion of first video data 262 and second video data 263 from a remote server, such as the servers 208, 212, and 214. The hardware decoder 232 is configured to decode a first type of encoded video data 264 but is not able to decode a second type of encoded video data 265. The software decoder 243 is configured to decode the second type of encoded video data 265. The controller 242 is operable to determine whether the second video packet data 261 includes the second type of encoded data 265 and to route the video packet data 261 to the software decoder 243 when the video packet data 261 includes the second type of encoded video data 265. The controller 242 is further operable to instruct the recording module 246 to record decoded video data 244 from the software decoder 243. The controller 242 is further operable to utilize the metadata generation module 241 to provide metadata 270 associated with the decoded video data 244 to the recording module 246. The metadata 270 includes a title 268 of the decoded video data 244. The title 268 includes a channel identifier 272, a geographic location 274, a timestamp 262, other metadata associated with the decoded video data 244, or any combination thereof. The metadata generation module 241 is operable to retrieve the channel identifier 272 and the geographic location 274 from the channel map 218 before generating the metadata 270. The metadata generation module 241 is operable to retrieve the timestamp 262 from the system hardware clock 236.

The playback module 240 is operable to generate a viewport 250 to enable a user to record the decoded video data 244 at the storage device 226 by selecting the user selectable record control 254. For example, a user may select the user selectable record control 254 to record the decoded video data 244 at the storage device 226. The viewport 250 is further operable to enable the title 256 of the recorded video data 280 to be selected for playback at the display 250. For example, a user may select the user selectable play item 252 to play the recorded video data 280 associated with the title 256.

In operation, the set-top box device 202 receives the first type of encoded video data 264 or the second type of encoded video data 265 based on a user selection. The first type of encoded video data 264 may include International Telecommunications Union (ITU) H.264 compliant video. The second type of encoded video data 265 may include video content that is not ITU H.264 compliant. In a particular embodiment, the second type of encoded video data 265 includes Society of Motion Picture and Television Engineers (SMPTE) Windows Media Video (WMV) compliant encoded video. In a particular embodiment, the second type of encoded video data includes over-the-top (OTT) video content. The OTT video content may include community-based content provided by the community-based content server 212 and Internet-based content provided by the Internet-based content server 214. The community-based content provided by the community-based content server 212 may include Public, Educational, and Governmental (PEG) video content, such as recordings of city council meetings.

The processor 234 executes the operational instructions of the controller 242 to determine whether the video packet data 261 is the second type of video data 265. When the controller 242 determines that the received encoded video data is the first type of encoded video data 264, the controller 242 instructs the hardware decoder 232 to decode the received encoded video data. When the controller 242 determines that the received encoded video data is the second type of encoded video data 265, the controller 242 instructs the software decoder 243 to decode the received encoded video data. When the user selects the user selectable record control item 254, the decoded video data 244 output from the software decoder 243 is recorded by the recording module 246 at the storage device 226 as recorded video data 280. The controller 242 generates the metadata 270 to enable the recording module 246 to associate the metadata 270, including the title 268, with the recorded video data 280.

By using the software decoder 243, content from the community-based content server 212 and the Internet-based content server 214 that is encoded using the second encoder 211 is decoded at the set-top box device 202 and viewed at the display 224. The software decoder 243 enables the set-top box device 202 to decode and display the second type of encoded video data 265 that is not decodeable by the hardware decoder 232. In addition, the metadata generation module 241 generates the metadata 270, enabling the decoded video data 244 to be recorded at the storage device 226 by associating the metadata 270 with the recorded video data 280. OTT content, such as community-based content and Internet-based content, does not include metadata and the recording module 246 is unable to record the decoded video data 244 without the metadata 270. Using the metadata generation module 241 to generate the metadata 270 enables recording of the decoded video data 244 at the storage device 226. Thus, the software decoder 243 and the metadata generation module 241 enable the set-top box device 202 to playback and record OTT video content, such as Public, Educational, and Governmental (PEG) video content.

Figure 3:
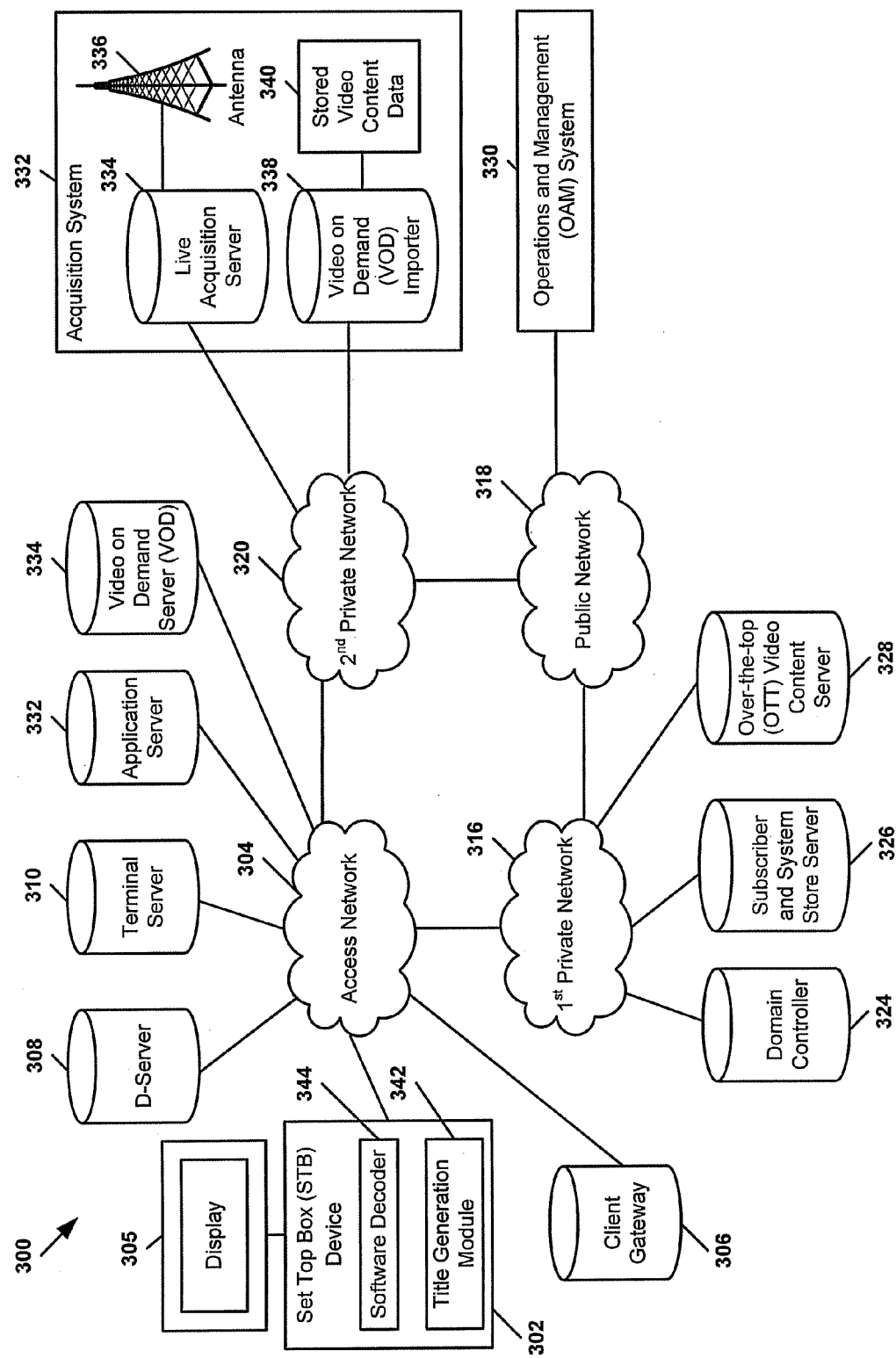
FIG. 3 is a block diagram of a first particular embodiment of a multimedia system.

Referring to FIG. 3, a block diagram of a first particular embodiment of a multimedia system is depicted and generally designated 300. The multimedia system 300 includes a set-top box device 302 coupled to an access network 304. A D-server 308, a terminal server 310, an application server 332, a video-on-demand (VOD) server 334, a client gateway 306, a first private network 316, and a second private network 320 are each coupled to the access network 304. A domain controller 324, a subscriber and system store server 326, an over-the-top (OTT) video server 328, and a public network 318 are each coupled to the first private network 316. In a particular embodiment, the public network 318 is the Internet. An operations and management (OAM) system 330 is coupled to the public network 318. An acquisition system 332 is coupled to the second private network 320. The acquisition system 332 includes a live acquisition server 334 and a video-on-demand (VOD) importer 338 that are both coupled to the second private network 320. An antenna 336 is coupled to the live acquisition server 334. Stored video content data 340 is coupled to the VOD importer 338.

The set-top box device 302 includes a software decoder 344 and a title generation module 342. A display 305 is coupled to the set-top box device 302. In a particular embodiment, the set-top box device 302 is the set-top box device 102 depicted in FIG. 1 or the set-top box device 202 depicted in FIG. 2.

The application server 332 is operable to provide downloadable software module updates and firmware updates to the set-top box device 302. In a particular embodiment, the application server 332 is operable to send the software decoder 344 and the title generation module 342, as executable files, to the set-top box device 302. The domain controller 324 is operable to provide security and authentication for set-top box devices, such as the set-top box device 302, requesting access to video content via the access network 304.

The subscriber and systems store server 326 is operable to store subscriber information and information related to the system 300. The over-the-top (OTT) video server 328 is operable to collect and make available over-the-top video content such as community-based programming and Internet-based programming. The operations and management (OAM) system 330 is operable to manage the various elements of the networks 304, 316, 318, and 320, such as the servers 308, 310, 326, 328, 332, and 334. The acquisition system 332 is operable to acquire different types of content. For example, the live acquisition server 334 is operable to acquire live content via the antenna 336 to enable the set-top box device 302 to access the acquired live content via the access network 304. The video-on-demand (VOD) importer 338 is operable to import stored video content data 340 to enable the set-top box device 302 to access the VOD content data 340 via the video-on-demand server 334. The D-server 308 is operable to provide video content buffering to ensure there is no transport delay. The terminal server 310 is operable to open connections to content outside the access network 304, such as content available via the public network 318.

By using the software decoder 344 and the title generation module 342 at the set-top box device 302, the set-top box device 302 is able to retrieve, display, and record over-the-top (OTT) video content such as Public, Educational, and Governmental Programming as well as Internet-based content accessed from the over-the-top (OTT) video server 328.

Figure 4:
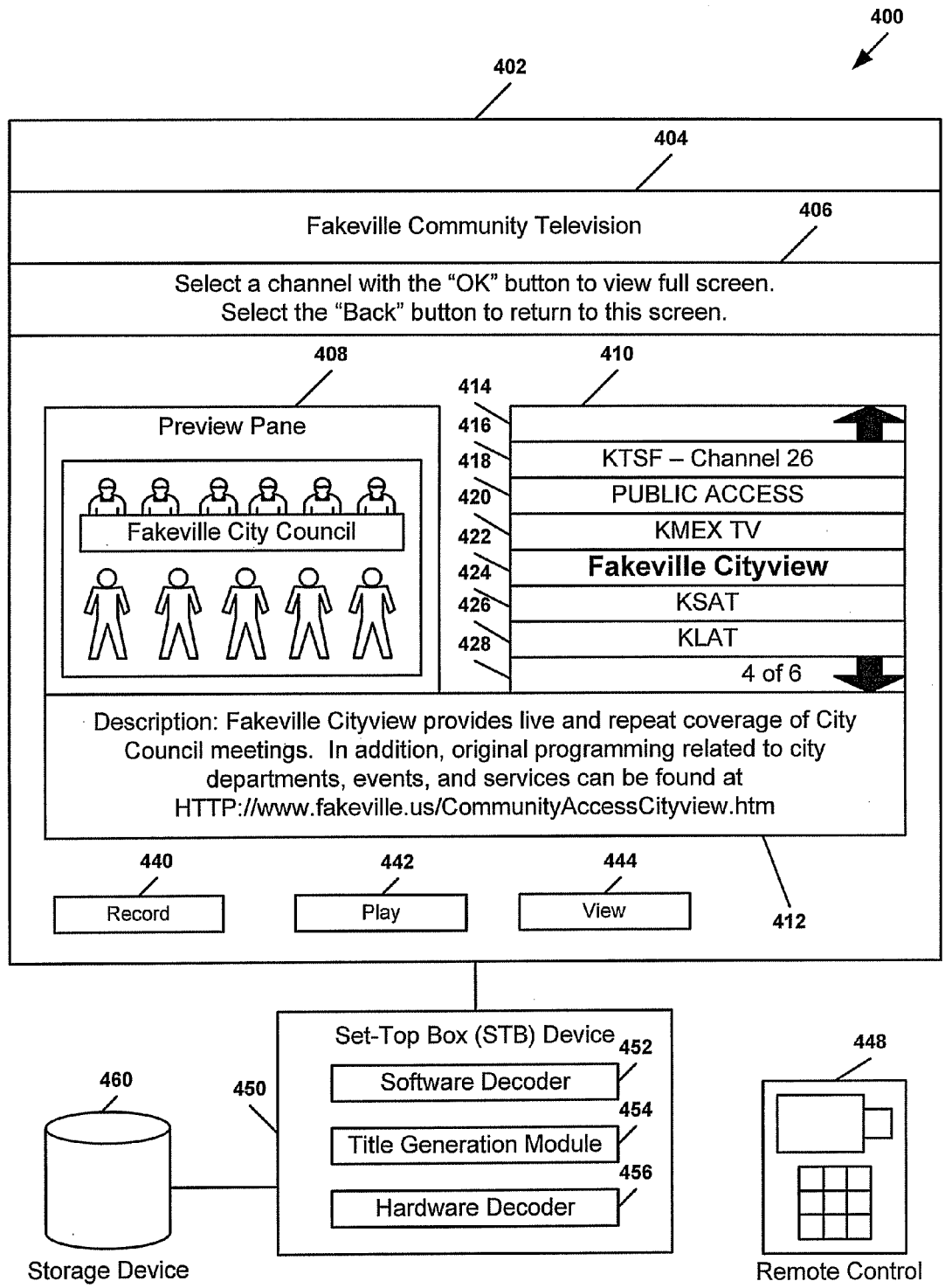
FIG. 4 is a diagram of a viewport to enable viewing and recording of encoded video data.

Referring to FIG. 4, a diagram of a system to enable viewing and recording of encoded video data is depicted and generally designated 400. The system 400 includes a viewport 402 and a set-top box device 450. The viewport 402 includes a channel name field 404, instructions 406, a preview pane 408, a channel guide 410, a description 412, a record 440 control, a play 442 control, and a view 444 control. The set-top box device 450 includes a software decoder 452, a title generation module 454, and a hardware decoder 456. Coupled to the set-top box device 450 is a storage device 460. In a particular embodiment, the storage device 460 is a digital video recorder (DVR).

The channel name field 404 is operable to display the name of the channel currently being displayed. The instructions 406 include instructions to a user to navigate the screen via a remote control 448 of the set-top box device 450. The preview pane 408 is operable to preview content of a selected channel. The channel guide 410 is operable to display channels adjacent to the selected channel, enabling a user to use the remote control 448 to scroll through and select a particular channel to preview or to view a full screen at the viewport 402.

The channel guide 410 includes a first scroll button 414 and a second scroll button 428. The selection guide 410 also includes a first channel 416, a second channel 418, a third channel 420, a selected channel 422, a fourth channel 424 and a fifth channel 426. In FIG. 4, the channel 422 is depicted as being selected for viewing in the preview pane 408. The description 412 describes information related to the channel selected for preview. In FIG. 4, the description 412 identifies that the selected channel provides live and repeat coverage of City Council Meetings. The record 440 control enables a user to record content displayed over the selected channel 422.

The set-top box device 450 may be the set-top box device 102 depicted in FIG. 1 or the set-top box device 202 depicted in FIG. 2. The hardware decoder 456 is operable to decode a first type of encoded video content but not a second type of encoded video content. For example, the hardware decoder 456 may be operable to decode H.264 compliant video content. The software decoder 452 is operable to decode a second type of encoded video content that is not H.264 compliant video content, such as Windows Media Video (WMV) content.

The software decoder 452 is operable to decode encoded video content received by the set-top box device 450 that is not decodeable by the hardware decoder 456. The title generation module 454 enables recording of video content decoded by the software decoder 452 and enables subsequent playback of the recorded video content. The title generation module 454 generates a title to enable a decoded video data from the software decoder 452 to be recorded and associated with the title. The associated title is then displayed after the recording is complete to enable a user to select the recorded video for playback.

In operation, a user selects a channel using the remote control 448 and the scroll buttons 414 and 428. The selected channel 422 is previewed at the preview pane 408. The user may use the remote control 448 to select the record 440 control, the play 442 control, or the view 444 control. When the record 440 control is selected, the selected channel 422 is recorded at the storage device 460 and the title generation module 454 generates a title that the storage device 460 associates with the recorded media data. The selection guide 410 may be used to view the titles associated with each recorded media program at the storage device 460. When the play 442 control is selected, previously recorded media data at the storage device 460 may be played at the viewport 402.

By using the software decoder 452, over-the-top (OTT) video content may be viewed at the viewport 402. By using the title generation module 454 to generate metadata that includes a title, the storage device 460 is able to record selected OTT video content and display the recorded OTT video content for subsequent playback at the viewport 402.

Figure 5:
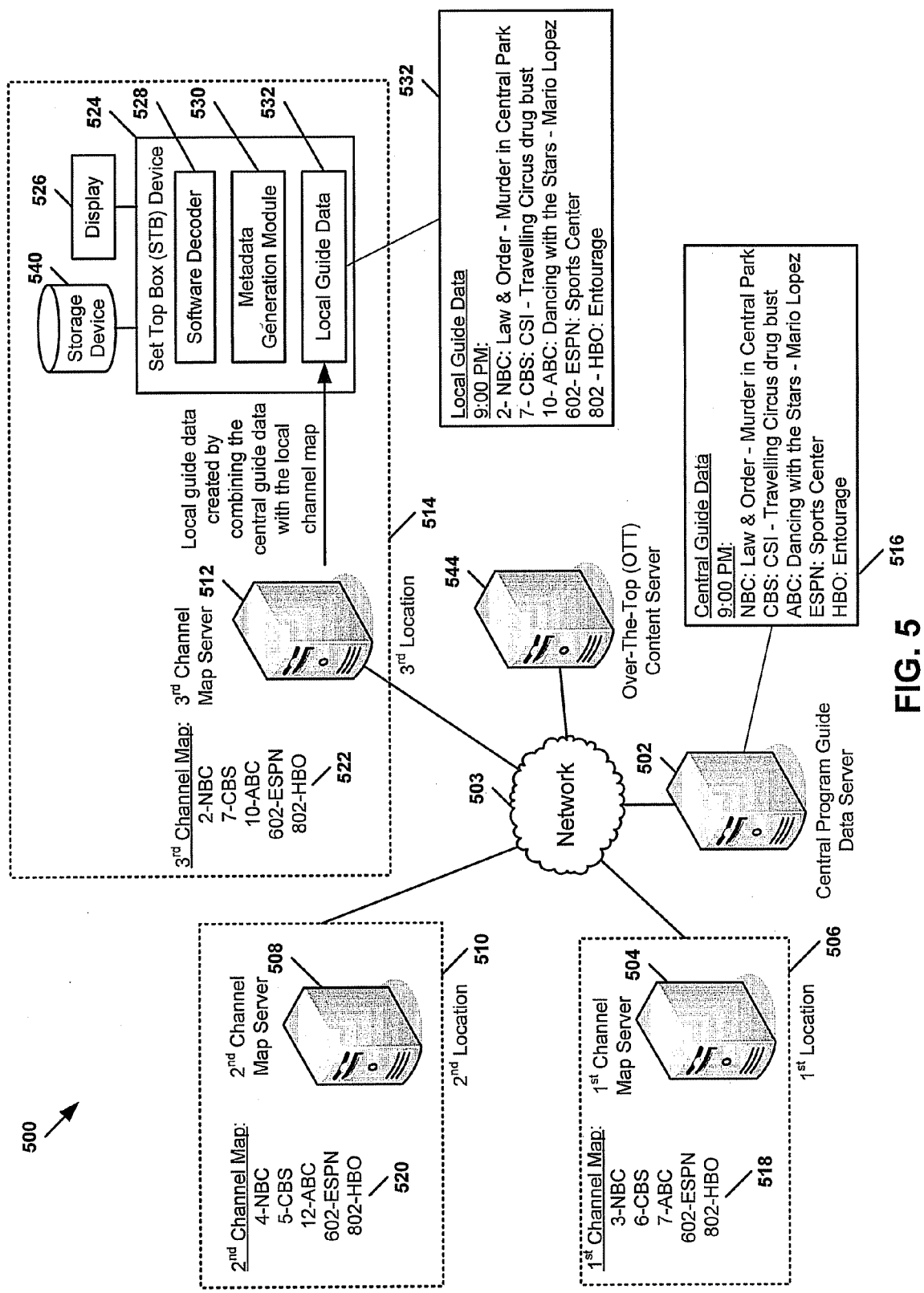
FIG. 5 is a block diagram of a second particular embodiment of a multimedia system.

Referring to FIG. 5, a block diagram of a second particular embodiment of a system is depicted and generally designated 500. In FIG. 5, a central program guide data server 502, a first channel map server 504 at a first location 506, a second channel map server 508 at a second location 510, a second channel map server 512 at a third location 514, and an over-the-top (OTT) content server 544 are each coupled to the network 503.

The central program guide data server 502 includes guide information associated with media content sourced by a service provider. The guide information includes information identifying video content to be transmitted at a particular channel at a particular time period. The first channel map 518 of the first channel map server 504 associates a channel identifier to a channel number at the first location 506. The second channel map 520 associates a channel identifier to a channel number at the second location 510. A third channel map 522 associates a channel number to a channel identifier at the third location 514. For example, in FIG. 5, the first channel map 518 indicates that at the first location 506, the channel identifier "NBC" is broadcast at channel 3, the channel identifier "CBS" is broadcast at channel 6, and the channel identifier "ABC" is broadcast at Channel 7. The second channel map 520 indicates that at the second location 510, the channel identifier "NBC" is broadcast at channel 4, the channel identifier "CBS" is broadcast at channel 5, and the channel identifier "ABC" is broadcast at channel 12. The third channel map 522 at the third location 514 indicates that the channel identifier "NBC" is broadcast at channel 2, the channel identifier "CBS" is broadcast at channel 7, and the channel identifier "ABC" is broadcast at channel 10.

A set-top box device 524 at the third location 514 is associated with the third channel map 522. Coupled to the set-top box device 524 is a display 526 and a storage device 540. The set-top box device 524 includes a software decoder 528, a metadata generation module 530, and local guide data 532.

In operation, when a user elects to record media content at the storage device 540, metadata associated with the media content is retrieved from the local guide data 532 and associated with the recorded media content at the storage device 540. The metadata includes a title of the recorded media content. The local guide data 532 is created by combining the central guide data 516 and the third channel map 522 associated with the location of the set-top box device 524. For example, the guide data 516 indicates that the channel identifier "NBC" is broadcasting an episode of Law and Order at 9:00 p.m., and the third channel map 522 indicates that channel identifier "NBC" is broadcast at channel 2. Thus, the local guide data 532 indicates that channel 2 has the channel identifier "NBC" that is broadcasting an episode of Law and Order.

Over-the-top (OTT) content is sourced from third party sources, such as community-based sources and internet-based sources, and is made available over the service provider's network 503. The OTT content is encoded using a different type of video encoding standard than the content sourced by the service provider and may not be decodeable by a hardware decoder (not shown) of the set-top box device 524. The central guide data 516 does not include information, such as metadata, associated with the OTT content because the OTT content is sourced from a third party rather than the service provider. By using the software decoder 528, OTT content that is encoded using a different type of encoding than the media content sourced by the service provider may be decoded at the set-top box device 524. By using the metadata generation module 530, metadata can be generated to enable recording of the OTT content at the storage device 540.

The metadata generation module 530 generates metadata that includes a title by retrieving a channel identifier and location information from the channel map 522 associated with the location 514 of the set-top box device 524. The metadata generation module 530 may also retrieve a timestamp of a system clock (not shown) of the set-top box device 524 to generate the metadata. The metadata generated by the metadata generation module 530 enables the storage device 540 to record the decoded media content output of the software decoder 528 and associate the generated metadata with the recorded media content. The metadata includes a title that the storage device 540 displays at the display 526 to enable the recorded media content to be selected for playback.

Figure 6:
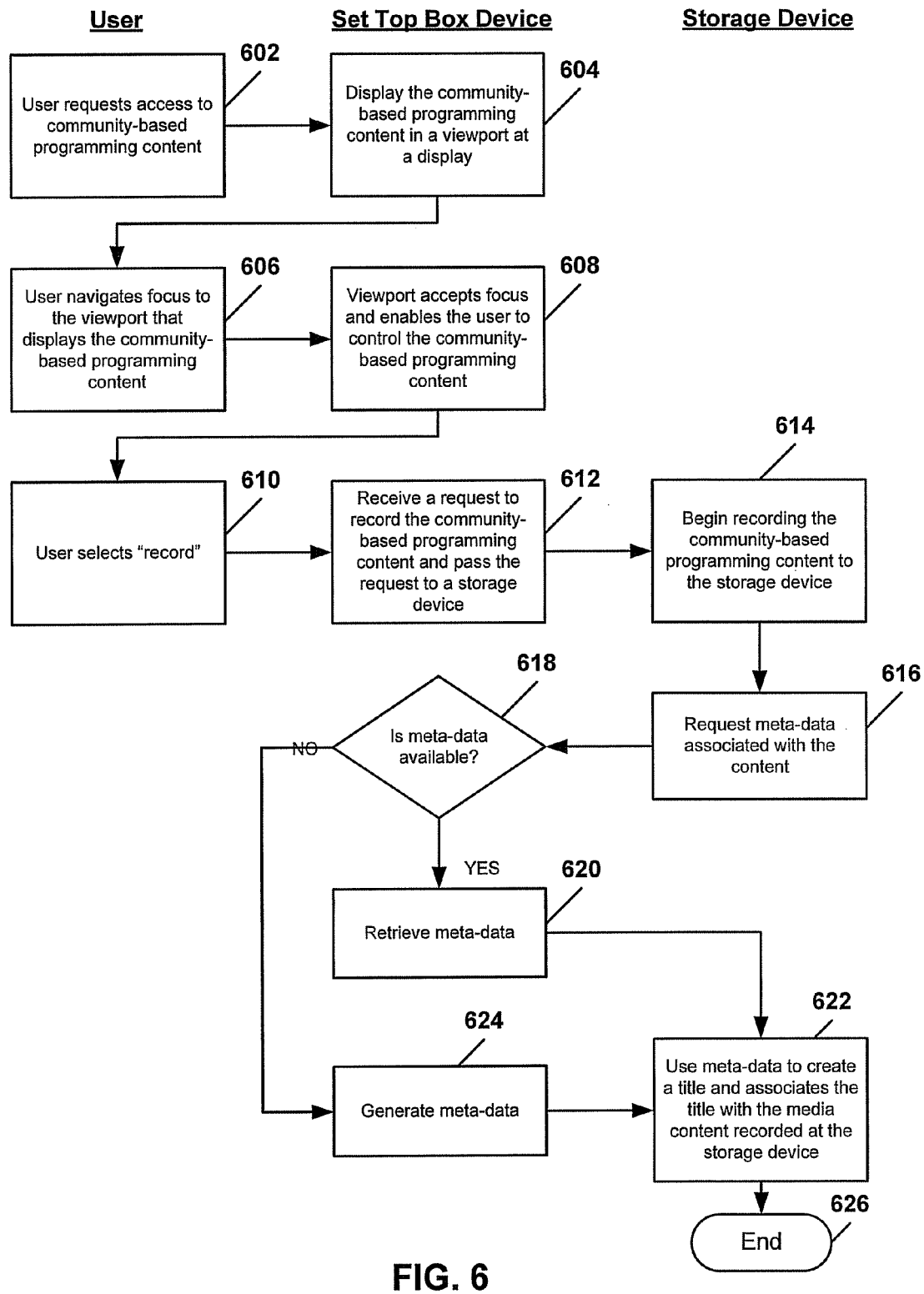
FIG. 6 is a flow diagram of a first particular embodiment of a method to record encoded video data.

FIG. 6 is a flow diagram of a first particular embodiment of a method to record encoded video data. A user requests access to community-based programming content, at 602. Continuing to 604, a set-top box device displays the community-based programming content in a viewport at a display. For example, the set-top box device 202 depicted in FIG. 2 may display community-based programming content from the community-based content server 212 at the viewport 250. Proceeding to 606, the user navigates focus to the viewport that displays the community-based programming content. Advancing to 608, the viewport accepts focus and enables the user to control the community-based programming content. For example, in FIG. 4, the viewport 402 may accept focus and enable the user to control the community-based programming content via the remote control 448.

Continuing to 610, the user selects "record". For example, in FIG. 4, the user may select the record 440 control via the remote control 448. Advancing to 612, the set-top box device receives the request to record the community-based programming content and passes the request to a storage device. For example, in FIG. 2, the recording module 246 receives the request to record content from the community-based content server 212 and passes the request to the storage device 226. Moving to 614, the storage device begins recording the community-based programming content at the storage device.

Proceeding to 616, the storage device requests metadata associated with the content. Continuing to 618, the set-top box device determines whether the metadata is available. When the metadata is available, at 618, the set-top box retrieves the metadata, at 620. For example, in FIG. 5, the metadata is retrieved from the local guide data 532 when the recorded media content is not over-the-top (OTT) media content.

When the metadata is not available, at 618, the metadata generation module generates the metadata, at 624. For example, in FIG. 2, the metadata generation module 241 generates the metadata 270 after retrieving the timestamp 262 from the system hardware clock 236 and after retrieving the channel identifier 272 and the geographic location 274 from the channel map 218. Proceeding to 622, the storage device uses the metadata to create a title and associates the title with the media content recorded at the storage device. The method then ends at 626.

Figure 7:
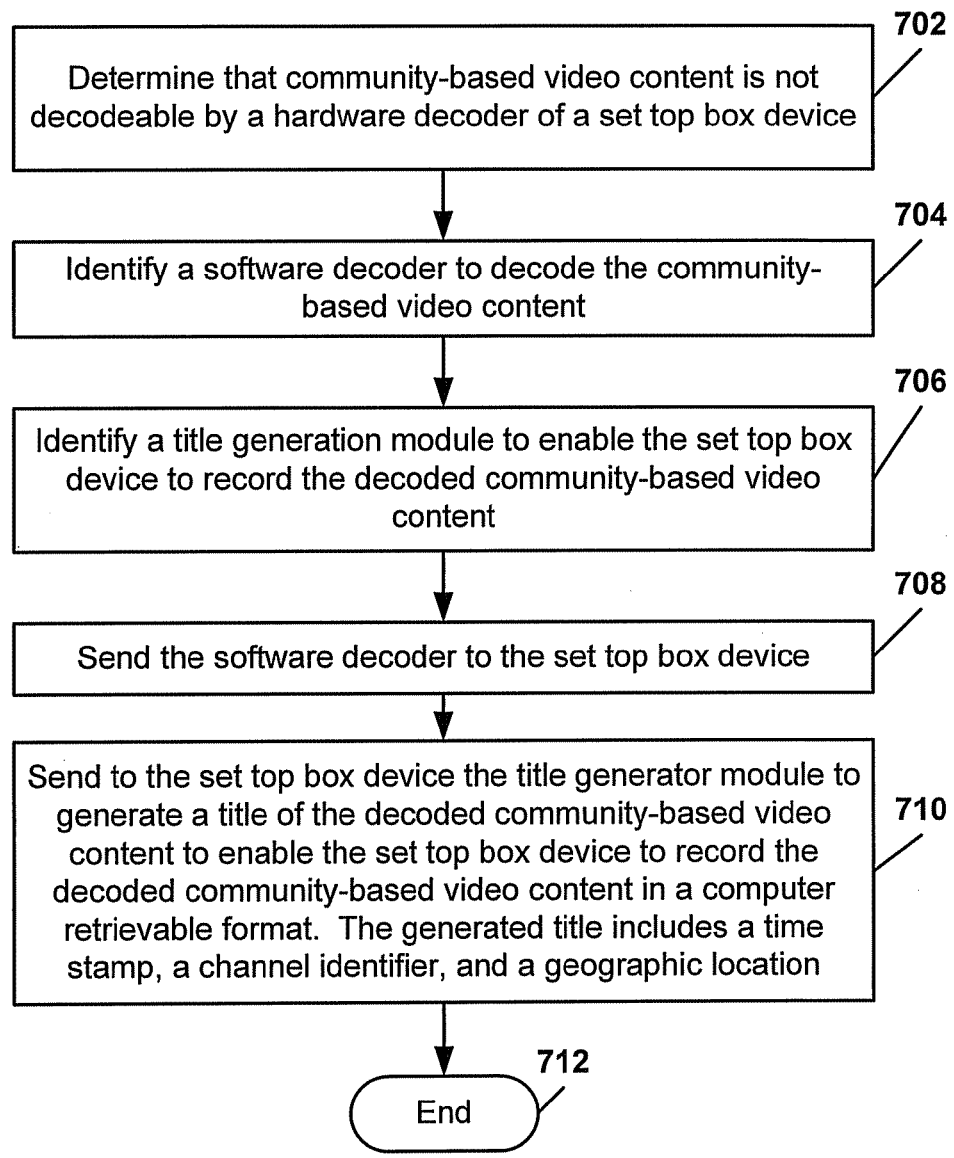
FIG. 7 is a flow diagram of a second particular embodiment of a method to record encoded video data.

FIG. 7 is a flow diagram of a second particular embodiment of a method to record encoded video data. The method of FIG. 7 may be executed by the update module 150 depicted in FIG. 1.

A determination is made that community-based video content is not decodeable by a hardware decoder of a set-top box, at 702. For example, in FIG. 1, the update module 150 determines that the community-based video content at the video content server 104 includes the second type of encoded video data 265 that is not decodeable by the hardware decoder 114. Continuing to 704, a software decoder to decode the community-based video content is identified. For example, in FIG. 1, the update module identifies the software decoder 146 to decode the community-based video content. Advancing to 706, a title generation module is identified to enable a set-top box device to record the decoded community-based video content. For example, the update module 150 in FIG. 1 identifies the title generation module 148 to enable the set-top box device 102 to record the decoded community-based video content at the storage device 128.

Proceeding to 708, the software decoder is sent to the set-top box device. For example, the update module 150 sends the software decoder 146 to the set-top box device 102 via the multimedia network 106. Continuing to 710, the set-top box device is sent the title generation module to generate a title of the decoded community-based video content to enable the set-top box device to record the decoded community-based video content in a computer retrievable format. The generated title may include a timestamp, a channel identifier, and a geographic location. For example, in FIG. 1, the update module 150 sends the title generation module 148 to the set-top box device 102 to enable the storage device 128 associated with the set-top box device 102 to record the decoded community-based video content in a computer retrievable format. As a further example, in FIG. 2, the metadata generation module 241 retrieves the timestamp 262 from the system hardware clock 236 of the set-top box device 102 and retrieves the channel identifier 272 and the geographical location 274 from the channel map 218 and generates the metadata 270 including the title 268. The method ends at 712.

Figure 8:
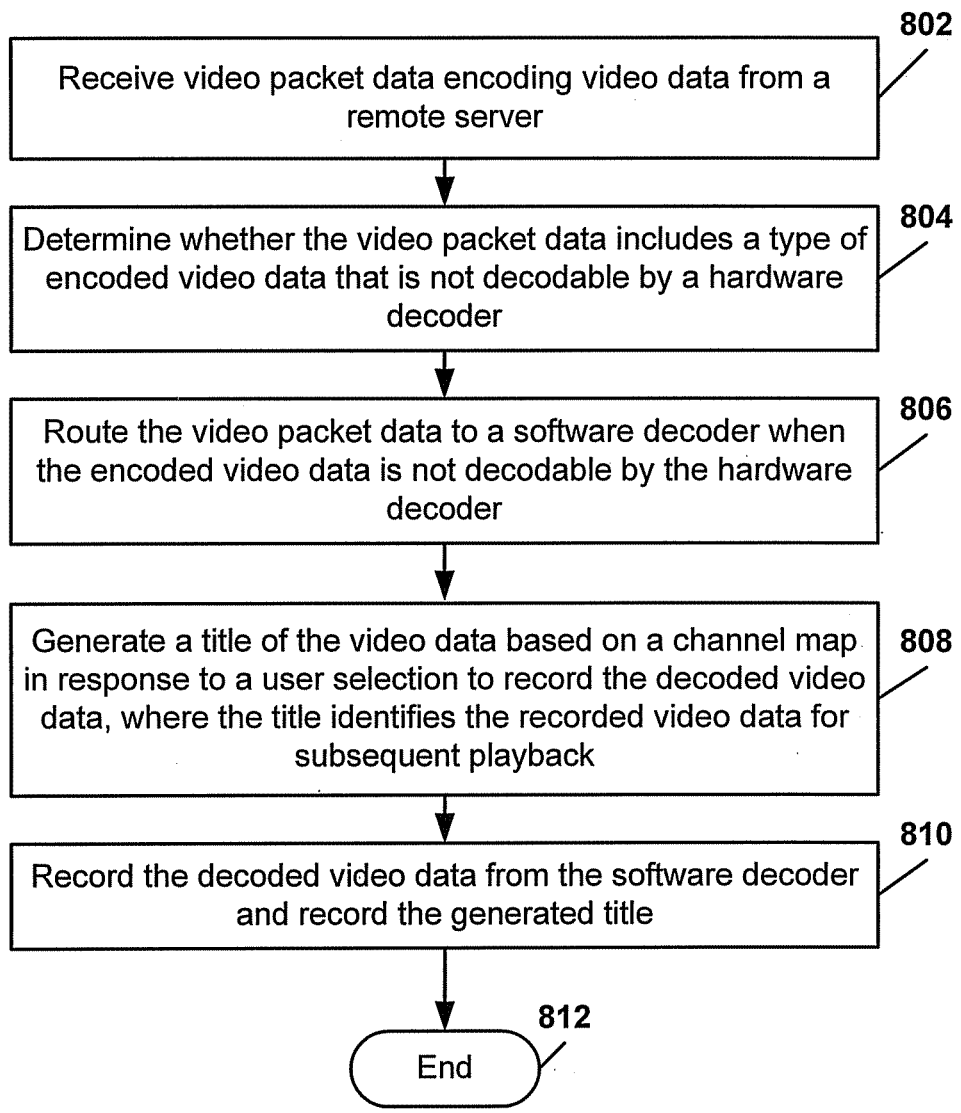
FIG. 8 is a flow diagram of a third particular embodiment of a method to record encoded video data.

FIG. 8 is a flow diagram of a third particular embodiment of a method to record encoded video data. The method may be executed by the controller 242 depicted in FIG. 2.

Video packet data encoding video data is received from a remote server, at 802. For example, in FIG. 1, the set-top box device 102 receives the video packet data 140 encoding the video data 138. Continuing to 804, a determination is made as to whether the video packet data includes a type of encoded video data that is not decodable by a hardware decoder. For example, in FIG. 1, the controller 124 determines whether the video packet data 140 includes a type of encoded video data that is decodeable by the hardware decoder 114. Advancing to 806, the video packet data is routed to a software decoder when the encoded video data is not decodable by the hardware decoder. For example, in FIG. 1, the controller 124 routes the video packet data 140 to the software decoder 146 when the encoded video data is not decodeable by the hardware decoder 114. Proceeding to 808, a title of the video data is generated based on a channel map in response to a user selection to record the video data, where the title identifies the recorded video data for subsequent playback. For example, in FIG. 1, the controller 124 may instruct the title generation module 148 to generate the title 132 in response to a user selection to record the decoded video data. Moving to 810, the decoded video data from the software decoder and the generated title are recorded. For example, in FIG. 1, the decoded video data 129 from the software decoder 146 and the title 132 generated by the title generation module 148 are recorded at the storage device 128. The method ends at 812.

Figure 9:
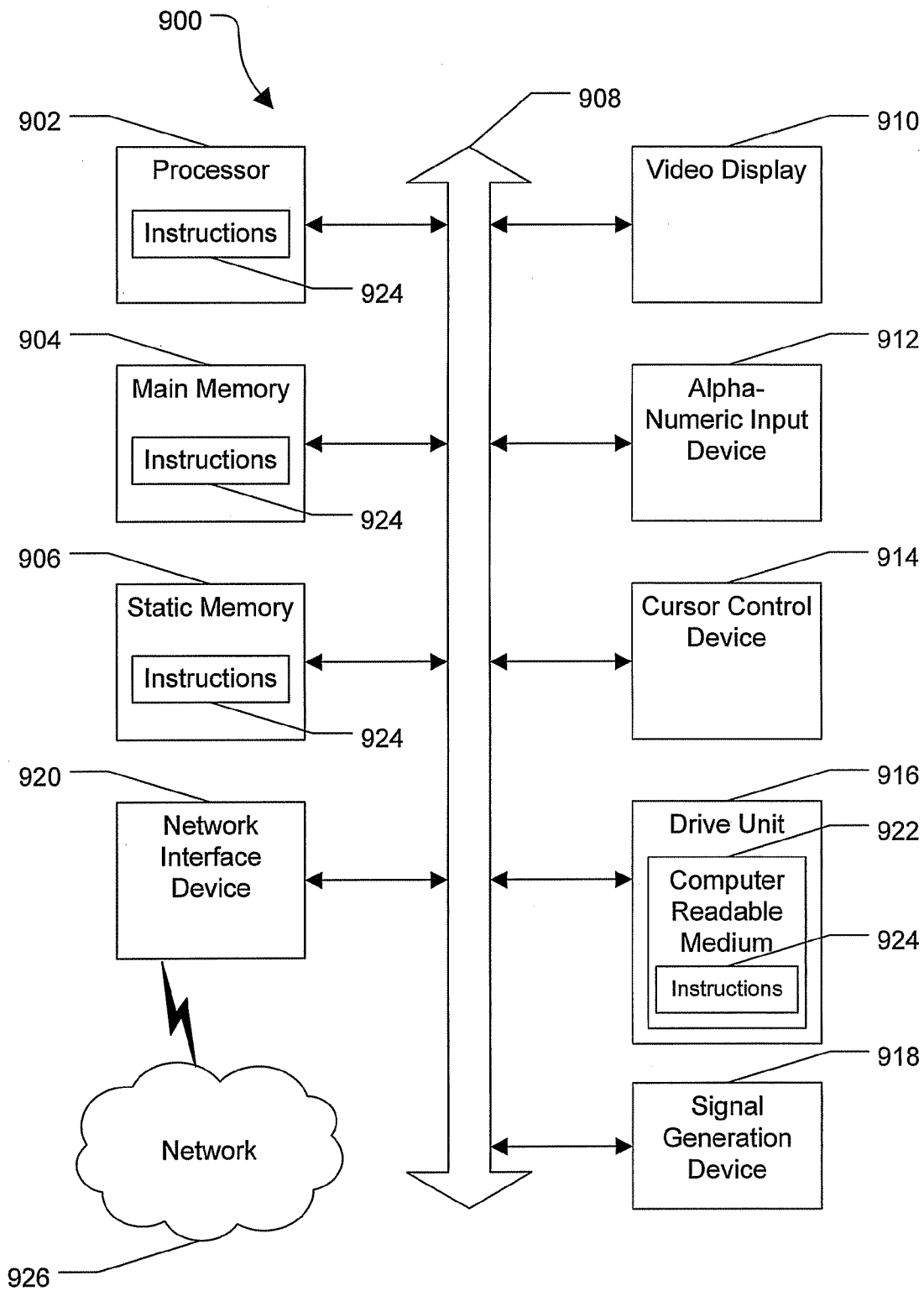
FIG. 9 is a block diagram of an illustrative embodiment of a general computer system.

Referring to FIG. 9, an illustrative embodiment of a general computer system is shown and is designated 900. The computer system 900 can include a set of instructions that can be executed to cause the computer system 900 to perform any one or more of the methods or computer based functions disclosed herein. The computer system 900, or any portion thereof, may operate as a standalone device or may be connected, e.g., using a network, to other computer systems or peripheral devices, such as a storage device, a display device, an update server, a media content server, a community-based content server, an internet-based content server, a D-server, a terminal server, an application server, a video-on-demand server, a subscriber and system store server, an over-the-top (OTT) video content server, and alive acquisition server as shown in FIG. 1-5.

In a networked deployment, the computer system may operate in the capacity of a server, such as a video server or an application server. The computer system 900 can also be implemented as or incorporated into various devices, such as a personal computer (PC), a tablet PC, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine operable to executing a set of instructions (sequential or otherwise) that specify actions to be taken by that machine. In a particular embodiment, the computer system 900 can be implemented using electronic devices that provide voice, video or data communication. Further, while a single computer system 900 is illustrated, the term "system" shall also be taken to include any collection of systems or sub-systems that individually or jointly execute a set, or multiple sets, of instructions to perform one or more computer functions.

As illustrated in FIG. 9, the computer system 900 may include a processor 902, e.g., a central processing unit (CPU), a graphics-processing unit (GPU), or both. Moreover, the computer system 900 can include a main memory 904 and a static memory 906 that can communicate with each other via a bus 908. As shown, the computer system 900 may further include a video display unit 910, such as a liquid crystal display (LCD), an organic light emitting diode (OLED), a flat panel display, a solid-state display, or a cathode ray tube (CRT). Additionally, the computer system 900 may include an input device 912, such as a keyboard, and a cursor control device 914, such as a mouse. The computer system 900 can also include a disk drive unit 916, a signal generation device 918, such as a speaker or remote control, and a network interface device 920.

In a particular embodiment, as depicted in FIG. 9, the disk drive unit 916 may include a computer-readable medium 922 in which one or more sets of instructions 924, e.g. software, can be embedded. Further, the instructions 924 may embody one or more of the methods or logic as described herein. In a particular embodiment, the instructions 924 may reside completely, or at least partially, within the main memory 904, the static memory 906, and/or within the processor 902 during execution by the computer system 900. The main memory 904 and the processor 902 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 924 or receives and executes instructions 924 responsive to a propagated signal, so that a device connected to a network 926 can communicate voice, video or data over the network 926. Further, the instructions 924 may be transmitted or received over the network 926 via the network interface device 920.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is operable to storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an email or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In accordance with various embodiments, the methods described herein may be implemented as one or more software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. The software may also utilize a signal including computer instructions. A digital file attachment to e-mail or other self-contained information archive or set of archives is considered a distribution medium equivalent to a tangible storage medium. Accordingly, the disclosure is considered to include a tangible storage medium or distribution medium as listed herein, and other equivalents and successor media, in which the software implementations herein may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, H.264, SMPTE WMV, MPEG 2, and MPEG 4) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A system comprising:
   a network interface operable to:
      receive a first packet that includes first data associated with first video content from a first remote server, wherein the first video content is encoded according to one of a first encoding type and a second encoding type;
      receive a software decoder from a second remote server, wherein the software decoder is operable to decode video content encoded according to the second encoding type; and
      receive a title generator from the second remote server, wherein the title generator is operable to generate a title of the video content encoded according to the second encoding type, wherein the title enables recording of the video content encoded according to the second encoding type in a computer retrievable format, and wherein the title includes a timestamp, a channel identifier, and a geographic location;
   a hardware decoder that is operable to decode video content encoded according to the first encoding type and is not operable to decode the video content encoded according to the second encoding type; and
   a controller operable to:
      determine an encoding type associated with the first video content;
      route the first data to the hardware decoder without routing the first data to the software decoder when the encoding type associated with the first video content is the first encoding type; and
      route the first data to the software decoder without routing the first data to the hardware decoder when the encoding type associated with the first video content is the second encoding type.

2. The system of claim 1, wherein the controller is further operable to instruct a recording module to record decoded video content output from the software decoder.

3. The system of claim 2, wherein the controller is further operable to provide metadata to the recording module, the metadata including the title.

4. The system of claim 1, wherein the title generator is further operable to retrieve the channel identifier and the geographic location from a channel map.

5. The system of claim 1, wherein the first encoding type includes International Telecommunication Union H.264 type encoding.

6. The system of claim 1, wherein the second encoding type includes encoding that is not compliant with International Telecommunication Union H.264.

7. The system of claim 1, wherein the second encoding type includes Society of Motion Picture and Television Engineers Windows Media Video type encoding.

8. The system of claim 1, wherein the first video content includes over-the-top video content, the over-the-top video content including one or more of public, educational, and governmental video content.

9. The system of claim 1, wherein the first video content includes over-the-top video content, the over-the-top video content including internet-based video content.

10. The system of claim 1, further comprising a display interface operable to display decoded video content at a display device and to display a user selection to enable recording of the decoded video content at a storage device.

11. The system of claim 10, wherein the display interface is further operable to enable the title of the recorded video content to be selected for playback.

12. A method, comprising:
receiving a first packet that includes first data associated with first video content from a first remote server, wherein the first video content is encoded according to one of a first encoding type and a second encoding type;
receiving a software decoder from a second remote server, wherein the software decoder is operable to decode video content encoded according to the second encoding type;
receiving a title generator from the second remote server, wherein the title generator is operable to generate a title of the video content encoded according to the second encoding type, and wherein the title enables recording of the video content encoded according to the second encoding type in a computer retrievable format;
determining, at a processor, an encoding type associated with the first video content, wherein the first encoding type is decodable by a hardware decoder and the second encoding type is not decodable by the hardware decoder;
selecting one of two, but not both, destinations, wherein the two destinations include the software decoder and the hardware decoder, and wherein the selected destination is the hardware decoder when the encoding type associated with the first video content is the first encoding type, and the selected destination is the software decoder when the encoding type associated with the first video content is the second encoding type;
routing the first data to the selected destination;
retrieving a channel identifier and a geographic location from a channel map, wherein the channel identifier and the geographic location are associated with the first video content; and
generating the title of the first video content in response to a user selection to record decoded video content at the software decoder, wherein the title includes a timestamp, the retrieved channel identifier, and the retrieved geographic location.

13. The method of claim 12, wherein the hardware decoder is operable to decode Motion Picture Experts Group type four compliant encoded video but is not operable to decode Society of Motion Picture and Television Engineers Windows Media Video compliant encoded video.

14. A computer-readable storage device comprising operational instructions, that when executed by a processor, cause the processor to:
receive a first packet that includes first data associated with first video content from a first remote server, wherein the first video content is encoded according to one of a first encoding type and a second encoding type;
receive a software decoder from a second remote server, wherein the software decoder is operable to decode video content encoded according to the second encoding type;
receive a title generator from the second remote server, wherein the title generator is operable to generate a title of the video content encoded according to the second encoding type, wherein the title enables recording of the video content encoded according to the second encoding type in a computer retrievable format, and wherein the title includes a timestamp, a channel identifier, and a geographic location;
determine an encoding type associated with the first video content, wherein the first encoding type is decodable by a hardware decoder and the second encoding type is not decodable by the hardware decoder;
select one of two, but not both, destinations, wherein the two destinations include the software decoder and the hardware decoder, and wherein the selected destination is the hardware decoder when the encoding type associated with the first video content is the first encoding type, and the selected destination is the software decoder when the encoding type associated with the first video content is the second encoding type;
route the first data to the selected destination;
retrieve the channel identifier and the geographic location from a channel map, wherein the channel identifier and the geographic location are associated with the first video content; and
generate the title of the first video content in response to a user selection to record decoded video content at the software decoder, wherein the title is generated based on the retrieved channel identifier and the retrieved geographic location.

15. The computer-readable storage device of claim 14, wherein the channel map associates a broadcast channel to a name of a channel content provider.

16. The computer-readable storage device of claim 14, further comprising operational instructions executable by the processor to cause the processor to record the decoded video content output from the software decoder.

17. The computer-readable storage device of claim 7, further comprising operational instructions, that when executed by the processor, cause the processor to enable playback of the recorded video content in response to a user selection of the title at a display.

18. A device, comprising:
a network interface operable to:
receive a first packet that includes first data associated with first video content from a first remote server, wherein the first video content is encoded according to one of a first encoding type and a second encoding type;
receive a software decoder from a second remote server, wherein the software decoder is operable to decode video content encoded according to the second encoding type; and
receive a title generator from the second remote server, wherein the title generator is operable to generate a title of the video content encoded according to the second encoding type, wherein the title enables recording of the video content encoded according to the second encoding type in a computer retrievable format, and wherein the title includes a timestamp, a channel identifier, and a geographic location;
a hardware decoder that is operable to decode video content encoded according to the first encoding type and is not operable to decode the video content encoded according to the second encoding type; and
a controller operable to:
determine an encoding type associated with the first video content;
route the first data to the hardware decoder without routing the first data to the software decoder when the encoding type associated with the first video content is the first encoding type; and
route the first data to the software decoder without routing the first data to the hardware decoder when the encoding type associated with the first video content is the second encoding type.

19. The device of claim 18, wherein the title generator is further operable to retrieve a channel identifier and a geographic location from a channel map server and to generate a title based on the channel identifier and the geographic location.

20. The device of claim 18, wherein the network interface is further operable to send a request to the second remote server to download the software decoder and the title generator.

21. The device of claim 20, wherein the software decoder and the title generator are downloadable via the network interface after the second remote server authenticates the request.

* * * * *